United States Patent
Yu et al.

(10) Patent No.: US 12,536,720 B2
(45) Date of Patent: Jan. 27, 2026

(54) SYSTEMS AND METHODS FOR MULTIMODAL LAYOUT DESIGNS OF DIGITAL PUBLICATIONS

(71) Applicant: Salesforce, Inc., San Francisco, CA (US)

(72) Inventors: Ning Yu, Palo Alto, CA (US); Chia-Chih Chen, Palo Alto, CA (US); Zeyuan Chen, Mountain View, CA (US); Caiming Xiong, Menlo Park, CA (US); Juan Carlos Niebles Duque, Palo Alto, CA (US); Ran Xu, Mountain View, CA (US); Rui Meng, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 458 days.

(21) Appl. No.: 18/161,680

(22) Filed: Jan. 30, 2023

(65) Prior Publication Data

US 2024/0104809 A1    Mar. 28, 2024

Related U.S. Application Data

(60) Provisional application No. 63/407,361, filed on Sep. 16, 2022.

(51) Int. Cl.
*G06T 11/60* (2006.01)
*G06F 40/106* (2020.01)
(Continued)

(52) U.S. Cl.
CPC ............ *G06T 11/60* (2013.01); *G06F 40/106* (2020.01); *G06F 40/126* (2020.01); *G06N 20/00* (2019.01);
(Continued)

(58) Field of Classification Search
CPC ....... G06T 11/60; G06T 9/00; G06T 2200/24; G06T 2210/12; G06F 40/106;
(Continued)

(56) References Cited

U.S. PATENT DOCUMENTS

2020/0320165 A1 * 10/2020 Srinivasan ........... G06V 30/414

FOREIGN PATENT DOCUMENTS

WO    WO-2021108038 A1 *  6/2021  ........... G06F 40/131

OTHER PUBLICATIONS

Diego Martin Arroyo, Janis Postels, and Federico Tombari. 2021. Variational transformer networks for layout generation. CVPR (2021).
(Continued)

*Primary Examiner* — Neil R McLean
(74) *Attorney, Agent, or Firm* — Haynes and Boone, LLP

(57) ABSTRACT

Embodiments described herein provide systems and methods for multimodal layout generations for digital publications. The system may receive as inputs, a background image, one or more foreground texts, and one or more foreground images. Feature representations of the background image may be generated. The foreground inputs may be input to a layout generator which has cross attention to the background image feature representations in order to generate a layout comprising of bounding box parameters for each input item. A composite layout may be generated based on the inputs and generated bounding boxes. The resulting composite layout may then be displayed on a user interface.

20 Claims, 15 Drawing Sheets

(51) Int. Cl.
  *G06F 40/126* (2020.01)
  *G06N 20/00* (2019.01)
  *G06T 9/00* (2006.01)
(52) U.S. Cl.
  CPC ............ *G06T 9/00* (2013.01); *G06T 2200/24* (2013.01); *G06T 2210/12* (2013.01)
(58) Field of Classification Search
  CPC .... G06F 40/126; G06F 40/103; G06F 40/131; G06F 40/216; G06N 20/00; G06N 3/0455; G06N 3/0464; G06N 3/0475; G06N 3/088; G06N 3/094; G06V 10/82; G06V 30/413; G06V 30/414
  USPC .......................................................... 382/156
  See application file for complete search history.

(56) References Cited

OTHER PUBLICATIONS

Shunan Guo, Zhuochen Jin, Fuling Sun, Jingwen Li, Zhaorui LI, Yang Shi, and Nan Cao. 2021. Vinci: an intelligent graphic design system for generating advertising posters. CHI (2021).

Kamal Gupta, Justin Lazarow, Alessandro Achille, Larry S Davis, Vijay Mahadevan, and Abhinav Shrivastava. 2021. Layouttransformer: Layout generation and completion with self-attention. ICCV (2021).

Akash Abdu Jyothi, Thibaut Durand, Jiawei He, Leonid Sigal, and Greg Mori. 2019. Layoutvae: Stochastic scene layout generation from a label set. ICCV (2019).

Kotaro Kikuchi, Edgar Simo-Serra, Mayu Otani, and Kota Yamaguchi. 2021. Constrained graphic layout generation via latent optimization. ACM MM (2021).

Xiang Kong, Lu Jiang, Huiwen Chang, Han Zhang, Yuan Hao, Haifeng Gong, and Irfan Essa. 2022. BLT: Bidirectional Layout Transformer for Controllable Layout Generation. ECCV (2022).

Hsin-Ying Lee, Lu Jiang, Irfan Essa, Phuong B Le, Haifeng Gong, Ming-Hsuan Yang, and Wellong Yang. 2020. Neural design network: Graphic layout generation with constraints. ECCV (2020).

Jianan Li, Jimei Yang, Aaron Hertzmann, Jianming Zhang, and Tingfa Xu. 2019. Layoutgan: Generating graphic layouts with wireframe discriminators. ICLR (2019).

Jianan Li, Jimei Yang, Jianming Zhang, Chang Liu, Christina Wang, and Tingfa Xu. 2020. Attribute-conditioned layout gan for automatic graphic design. TVCG (2020).

Akshay Gadi Patil, Omri Ben-Eliezer, Or Perel, and Hadar Averbuch-Elor. 2020. Read: Recursive autoencoders for document layout generation. CVPR Workshops (2020).

Xinru Zheng, Xiaotian Qiao, Ying Cao, and Rynson WH Lau. 2019. Content-aware generative modeling of graphic design layouts. TOG (2019).

\* cited by examiner

| Method | Realism | | Accuracy | | Overlap ↓ | Regularity Misalignment (×10⁻²) ↓ |
|---|---|---|---|---|---|---|
| | Layout FID ↓ | Image FID ↓ | IoU ↑ | DocSim ↑ | | |
| Conditional LayoutGAN++ | 4.25 | 28.40 | 0.163 | 0.130 | 0.104 | 0.759 |
| + Generator reconstruction (Eq. 20) | 3.27 | 29.56 | 0.186 | 0.148 | 0.125 | 0.853 |
| + Unconditional discriminator (Eq. 3, 5) | 3.70 | 29.21 | 0.177 | 0.140 | 0.103 | 0.681 |
| + gIoU loss (Eq. 18) | 3.23 | 28.20 | 0.182 | 0.138 | 0.106 | 0.721 |
| + Overlap loss [46] + Misalign loss [46] | 3.19 | 27.35 | 0.208 | 0.151 | 0.101 | 0.646 |

FIG. 10

| Method | Realism | | Accuracy | | Overlap ↓ | Regularity |
|---|---|---|---|---|---|---|
| | Layout FID ↓ | Image FID ↓ | IoU ↑ | DocSim ↑ | | Misalignment (x10-2) ↓ |
| LayoutDETR-GAN (ours) | 3.19 | 27.35 | 0.208 | 0.151 | 0.101 | 0.646 |
| - Text length embeddings | 3.24 | 28.65 | 0.191 | 0.144 | 0.117 | 0.807 |
| - Text class embeddings | 25.17 | 29.25 | 0.166 | 0.132 | 0.110 | 0.000 |

FIG. 11

| Method | Realism | | Accuracy | | Overlap ↓ | Regularity |
|---|---|---|---|---|---|---|
| | Layout FID ↓ | Image FID ↓ | IoU ↑ | DocSim ↑ | | Misalignment (×10⁻²) ↓ |
| LayoutGAN++ [32] | 4.25 | 28.40 | 0.163 | 0.130 | 0.104 | 0.759 |
| READ [58] | 4.45 | 32.10 | 0.177 | 0.141 | 0.093 | 2.867 |
| Vinci [18] | 38.97 | 58.12 | 0.104 | 0.143 | 0.243 | 0.271 |
| LayoutTransformer [19] | 5.47 | 39.70 | 0.080 | 0.115 | 0.127 | 3.632 |
| LayoutDETR-GAN (ours) | 3.19 | 27.35 | 0.208 | 0.151 | 0.101 | 0.646 |
| LayoutDETR-VAE (ours) | 3.25 | 27.47 | 0.216 | 0.152 | 0.119 | 1.737 |
| LayoutDETR-VAE-GAN (ours) | 3.23 | 27.88 | 0.210 | 0.151 | 0.117 | 1.439 |

FIG. 12

| Method | Realism | | Accuracy | | Overlap ↓ | Regularity |
|---|---|---|---|---|---|---|
| | Layout FID ↓ | Image FID ↓ | IoU ↑ | DocSim ↑ | | Misalignment (×10⁻²) ↓ |
| LayoutGAN++ [32] | 14.12 | 7.49 | 0.049 | 0.078 | 0.817 | 1.057 |
| READ [58] | 3.68 | 5.38 | 0.312 | 0.121 | 0.099 | 2.045 |
| Vinci [8] | 22.98 | 13.04 | 0.178 | 0.104 | 0.253 | 2.526 |
| LayoutTransformer [19] | 2.64 | 5.27 | 0.216 | 0.106 | 0.357 | 0.833 |
| LayoutDETR-GAN (ours) | 1.84 | 5.22 | 0.261 | 0.113 | 0.083 | 0.773 |
| LayoutDETR-VAE (ours) | 4.99 | 5.49 | 0.327 | 0.123 | 0.205 | 5.119 |
| LayoutDETR-VAE-GAN (ours) | 3.98 | 5.87 | 0.158 | 0.108 | 0.148 | 0.691 |

FIG. 13

SYSTEMS AND METHODS FOR MULTIMODAL LAYOUT DESIGNS OF DIGITAL PUBLICATIONS

CROSS REFERENCES

The instant application is a nonprovisional of and claim priority under 35 U.S.C. 119 to U.S. provisional application No. 63/407,361, filed Sep. 16, 2022, which is hereby expressly incorporated by reference herein in its entirety.

TECHNICAL FIELD

The embodiments relate generally to natural language processing and machine learning systems, and more specifically to systems and methods for multimodal layout designs of digital publications.

BACKGROUND

Graphic layout designs (e.g., user portal, news website, advertisement banners, etc.) play an important role in communication between media designers and audience. Traditionally, digital layout products are mostly designed by human designers, which often require a high level of skills. Such design task is time-consuming, and hardly scalable to batch production. In recent years, machine learning systems have been widely used in natural language processing tasks, and/or vision tasks such as object detection, classification of visual contents, and/or the like.

Therefore, there is a need for machine learning system-based automation of graphic layout designs.

BRIEF DESCRIPTION OF THE DRAWINGS

FIGS. 10-13 provide charts illustrating exemplary performance of different embodiments described herein.

Figure 1:
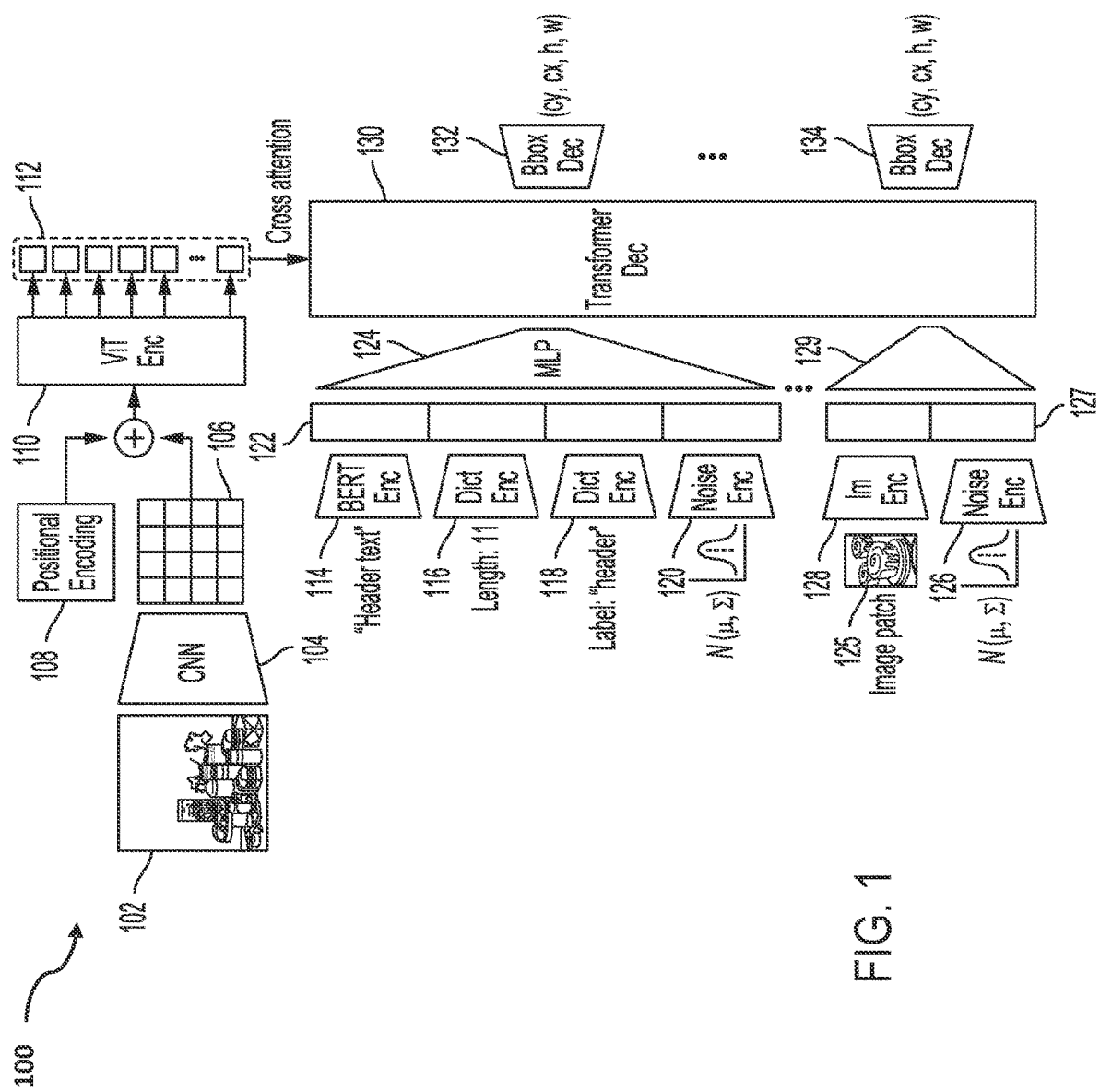
FIG. 1 is an example diagram illustrating an example framework of layout generator, according to some embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Graphic layout designs help to facilitate effective communication between media designers and their target audience. For example, successful advertisement layouts function to promote information presentation, guide audience attention, and boost visual attractiveness of advertising banners, webpages, etc. Multimodal elements, i.e., foreground images/texts, are framed by layout bounding boxes and spatially arranged on a background image, such that they synergize each other aesthetically and convey the purpose of design clearly. While this task is often accomplished by human UI designers with a deep understanding of the semantics of each element and their harmony as a whole, such design tasks can be time consuming and costly. Human production also limits the volume of batch production of layout designs.

In view of the need for an efficient and automatic layout design system, embodiments described herein provide a multimodal conditioned graphic layout generation system that generates recommended layouts based on inputs of an arbitrary background image, foreground images, and foreground text prompts from varying categories. For example, a generative model that outputs conditional layout distribution may be constrained by a background image and driven by foreground elements. This generative model may be trained to learn the prior distribution from large-scale realistic layout samples, and thus to learn features of the appearances and semantics of background images, and features of the appearances and semantics of foreground elements. The generative model may also interact across background and multiple foreground elements and generate the layout bounding box parameters of each foreground element.

Training of the generative model may include a number of different elements. For example, the layout generator may be trained together with an encoder as an auto-encoder or variational auto-encoder (VAE) as is discussed in more detail with respect to FIG. 2A. A generative adversarial network (GAN) loss component may also be used including a conditional discriminator and an auxiliary decoder, discussed in more detail with respect to FIG. 2B. Finally, a conditional reconstructor may be used to generate an additional reconstruction loss, discussed in more detail with respect to FIG. 2C. Each of these elements may be used individually or in combination for the training of the layout generator.

Embodiments described herein provide a number of benefits. For example, The variety of inputs (foreground images, different text categories, etc.) allows for the model to generate a model based on foreground contents, whether they overlap or are overlaid on top of background sub-regions, and treat different input types (e.g., header or body text) differently. Rather than selecting from a set of predefined layout types, the generative model is able to generate arbitrary layouts conditioned on the inputs. The training methods which are described further herein allow for high accuracy in reconstruction of input layouts, ensuring that the generated model is attending to the inputs. Layouts for digital publications, for example advertisements, may be automatically generated by the model and distributed to be displayed on user interface devices.

Overview

FIG. 1 is an example diagram illustrating an example framework 100 of layout generator, according to some embodiments described herein. The framework 100 comprises a transformer decoder 130 which generates bounding boxes via bounding box decoders (e.g., bounding box decoders 132 and 134) based on encoded inputs with cross attention to bounding box detected features of a background image 102. Specifically, a background image 102 is first encoded using a convolutional neural network (CNN) 104 to produce image representation 106 which is a compact feature representation of the background image 102. Image representation 106 is concatenated with a positional encoding 108 and encoded using a multi-head visual transformer (ViT) encoder 110 to produce output tokenized visual features 112. The tokenized visual features 112 may represent bounding boxes of features present in background image 102. This may be done according to a DETR style encoding to understand the context of the background image, and learn where is reasonable to superimpose foreground elements, for example less busy regions of the background image. By giving cross attention to visual features 112 via transformer decoder 130, the model learns to detect in background image 102 the reasonable locations, scales, and spatial relations for the multimodal foreground elements in the layout. This leverages the powerful image understanding capability of detectors, and combines it with the generation realism of a layout generator, in order to address multimodal layout generation.

Foreground elements such as text headers are encoded before being input to transformer decoder 130. For example, first, a header text element has each sub-element describing it encoded individually. To calculate the text embedding, each text string, text class, and text length are separately encoded and their features concatenated together. The text string is encoded by the pretrained and fixed BERT text encoder [13]. The text class and quantized text length are encoded by learning a dictionary. To calculate the image embedding, the same visual encoder as used for background encoding may be used, and the weights are shared and initialized by Up-DETR-pretrained model. As illustrated, the actual text may be encoded via a text encoder 114 such as a BERT encoder as described in Devlin et al., BERT: Pre-training of deep bidirectional transformers for language understanding, NAACL, 2019. The length of the text may be encoded by a dictionary encoder 116. The label describing the category of foreground element (in this example "header") may be encoded via a dictionary encoder 118.

In some embodiments, a multivariate gaussian noise parameter may be sampled and encoded by a noise encoder 120. The input noise during inference may be a standard Gaussian distribution (i.e., with 0 mean and a standard deviation of 1). For each layout generation, a vector may be sampled based on the gaussian noise parameter (defined by mean and standard deviation vectors). Each of the sub-elements associated with a foreground element may be concatenated, illustrated in this example as concatenated vector 122. The concatenated vector 122 may be further encoded via a multi-layer perceptron (MLP) 124 before being input to the transformer decoder 130. Similar to the "header" foreground element, any other foreground element which is input may be similarly encoded. Foreground images such as image 125 may be encoded by an image encoder 128. Similar to other foreground text features, a multivariate gaussian noise parameter may be sampled and encoded by a noise encoder 126 and concatenated with the encoded image to provide concatenated vector 127. The concatenated vector 127 may be further encoded via a MLP 129 before being input to the transformer decoder 130.

Transformer decoder 130 decodes the input foreground elements with cross attention to the background image features 112 to provide bounding box outputs for each of the input foreground elements. Bounding boxes may be provided via bounding box decoders such as bounding box decoders 132 and 134, which use outputs of transformer decoder 130 as inputs. The generated layout defined by the bounding boxes may be used to composite the foreground elements with the background image 102 in their locations defined by the bounding boxes. The composed layout may be rendered for a display, for example on a user device. In some embodiments, variations of a generated layout may be generated by making random adjustments to foreground element positions. In other embodiments, variations may be generated by enforcing a rule, such as enforcing that foreground elements do not overlap, and moving the foreground elements accordingly.

Figure 2A:
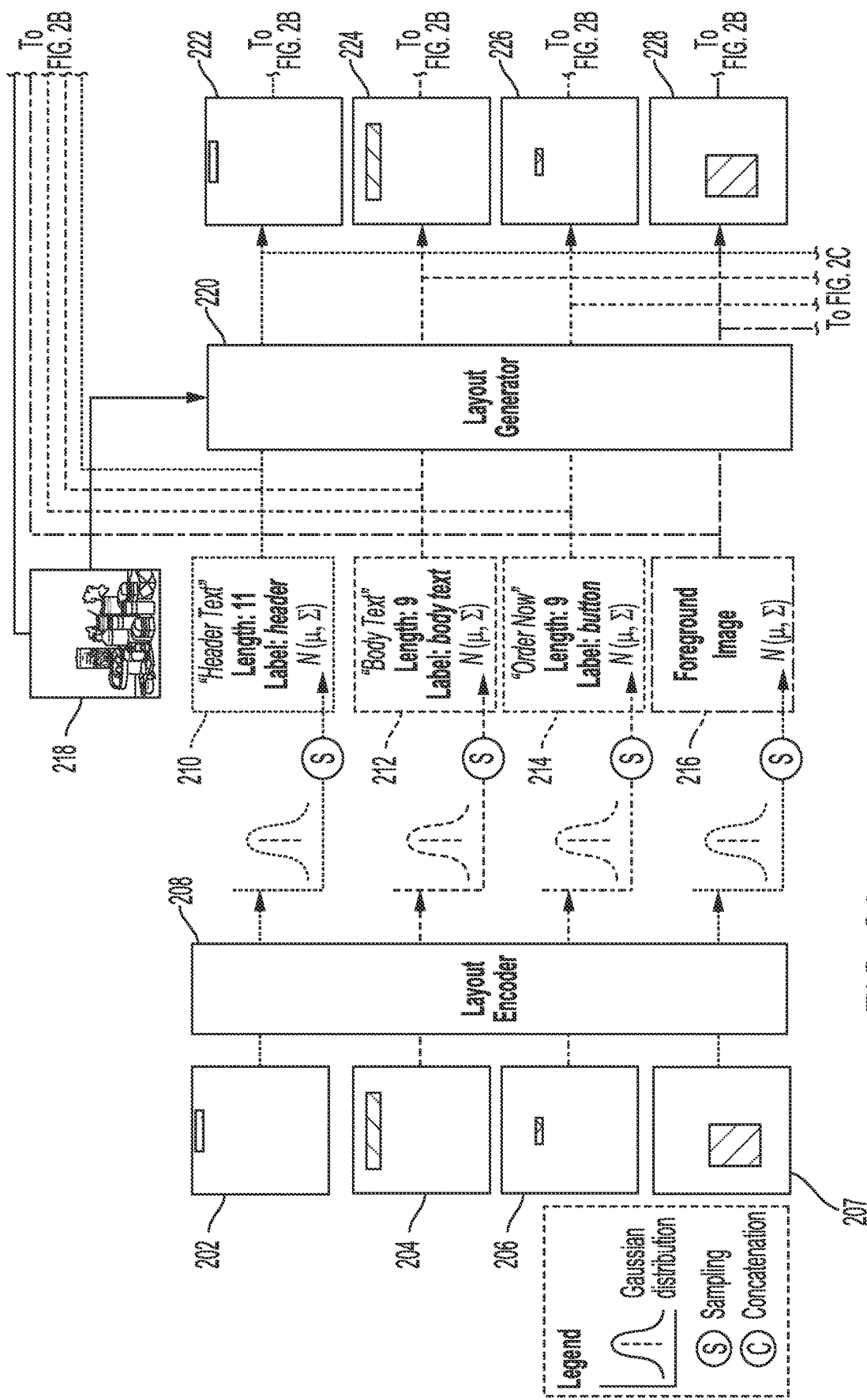
FIGS. 2A-2C illustrate exemplary components of a training framework for a layout generator, according to some embodiments described herein.
Figure 2B:
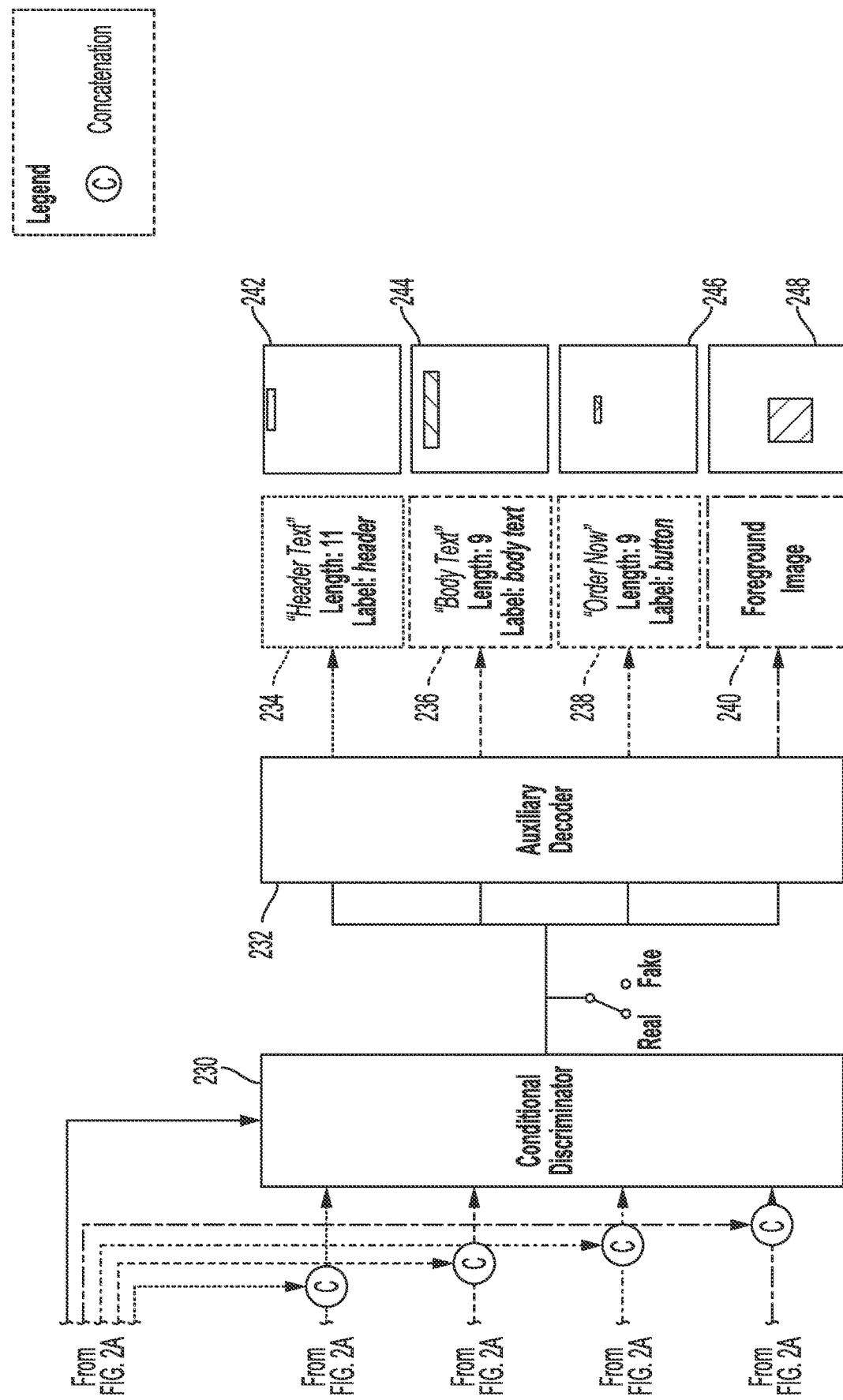
Figure 2C:
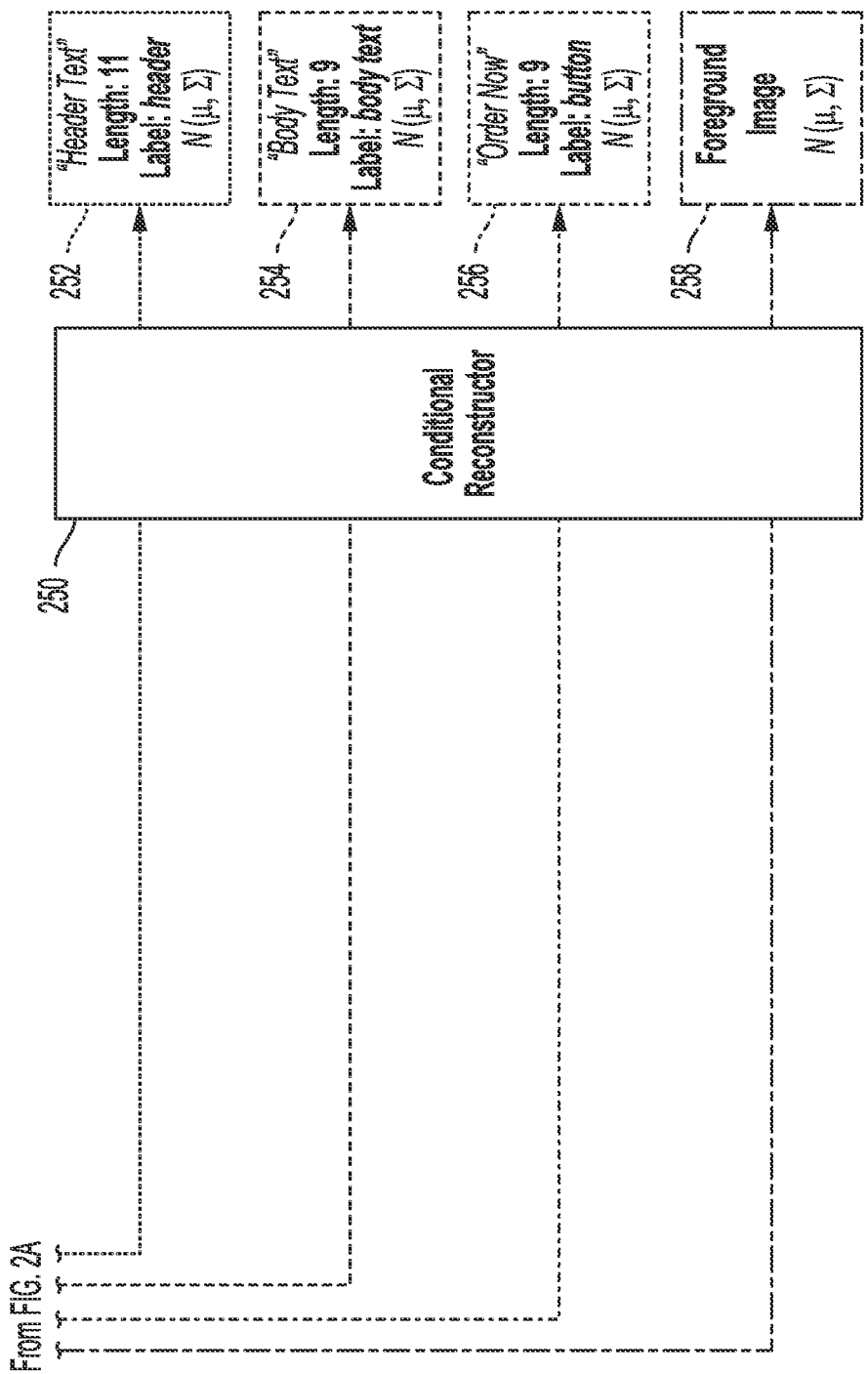

FIGS. 2A-2C illustrate exemplary components of a training framework for a layout generator, according to some embodiments described herein. As illustrated, each of the training components in FIGS. 2A-2C are interconnected showing one training framework. However, in some embodiments, training of the layout generator may be performed with different combinations of a subset of the training components.

FIG. 2A illustrates a variational auto-encoder (VAE) component for training layout generator 220. Layout Generator 220 may include the encoders, decoders, and other elements described with respect to FIG. 1. VAEs consist of two interacting neural networks, an encoder (e.g., layout encoder 208) and a generator (e.g., layout generator 220), that are jointly trained to maximize the evidence lower bound (ELBO) of real sample distribution. The encoder 208 learns to represent high-dimensional data using a lower-dimensional latent Gaussian distribution which is also regularized by a standard Gaussian prior distribution. After the differentiable reparameterization of stochastic sampling, the generator 220 maps the latent samples to fake data samples and approximates ELBO. After VAE training, a visual content can be efficiently generated by first sampling a latent variable from the standard Gaussian prior distribution, and then passing it through the generator 220 as described in FIG. 1.

Specifically, training layout data is parsed to provide bounding boxes for foreground elements. Foreground element bounding boxes 202, 204, 206, and 207 are used as inputs to layout encoder 208, which generates multivariate gaussian distributions based on the inputs, with cross-attention between inputs. Layout generator inputs 210, 212, 214, and 216 each comprise meta-data about each foreground element concatenated with a sample from their respective noise distribution. For example, layout generator input 210 includes the text of the foreground element, "Header Text", the length of the element, 11, and a label for the category of the element, "header" concatenated with a sample of the relevant distribution from layout encoder 208. The encoding and concatenating of each of the layout generator inputs is described with respect to FIG. 1. Background image 218 is also an input to layout generator 220, which processes background image 218 as described with respect to background image 102 in FIG. 1.

Based on the inputs, layout generator 220 generates bounding boxes for each of the foreground elements. During training, the generated bounding boxes are compared to the input bounding boxes in order to compute a loss which is used to update model parameters via back-propagation, discussed in more detail below. In the illustrated example, bounding boxes 222, 224, 226, and 228. Further, the final feature layer of the layout generator 220 model may be used by other training components as described with respect to FIGS. 2B-2C.

FIG. 2B illustrates a generative adversarial network (GAN) component f or training layout generator 220. GANs consist of two interacting neural networks, a generator (e.g., layout generator 220) and a discriminator (e.g. conditional discriminator 230), that are adversarially trained in a zero-sum game: The generator 220 learns to synthesize fake samples that resemble real samples and fool the discriminator 230. The discriminator 230 learns as a binary classifier to distinguish apart real and fake samples. The conditional discriminator is conditioned on the multimodal inputs as well.

An auxiliary decoder 232 may use the final feature layer of the conditional discriminator 230 model and be trained to reconstruct the inputs. In the illustrated example, the reconstructed inputs include foreground elements 234, 236, 238, and 240, and their associated bounding boxes 242, 244, 246, and 248. By training the conditional discriminator 230 jointly with auxiliary decoder 232, this ensures that the features used by the conditional discriminator encode all the necessary information.

FIG. 2C illustrates a reconstructor component for training layout generator 220. Using the final feature layer of layout generator 220 as an input, conditional reconstructor 250 may generate outputs which are trained to replicate the inputs to layout generator 220. In the illustrated example, the conditional reconstructor 250 reconstructs foreground elements 252, 254, 256, and foreground image 258.

Specific embodiments of the training method using the components described above, including additional components which are not illustrated, may be described formally as follows. A single graphic layout sample $\mathcal{L}$ is represented by a set of N 2D bounding boxes, for example bounding boxes 202, 204, 206, and 207 represented as $$\{b^i\}_{i=1}^{N},$$

each of which ($b^i$) is parameterized by a vector with four elements: its center location in a background image ($y^i$, $x^i$), height $h^i$, and width $w^i$. In order to handle background images B with arbitrary sizes (H, W), we normalize box parameters by their image size correspondingly, i.e., $$\mathcal{L} = \{(y^i/H, x^i/W, h^i/Y, w^i/W)\}_{i=1}^{N} \doteq \{\hat{b}^i\}_{i=1}^{N}.$$

Multimodal input conditions consist of the background image B (e.g., background image 218) and a set of N foreground elements, in the form of either texts $$T = \{t^i\}_{i=1}^{M} = \{(s^i, c^i, l^i)\}_{i=1}^{M}$$

or image patches $$\mathcal{P} = \{p^i\}_{i=1}^{K},$$

where M≥0, K≥0, M+K=N. $s^i$ stands for the text content string, $c^i$ stands for the text class belonging to {header text, body text, disclaimer text, button text}, and $l^i$ stands for the length of the text string. Each foreground element corresponds to a bounding box in the layout, indicating its location and size. The training goal is therefore to learn a layout generator G (e.g., layout generator 220) that takes a latent noise vector z and the multimodal conditions as input, and outputs a realistic and reasonable layout complying with the multimodal control:

$$G(z,B,T\cup\mathcal{P})\mapsto \mathcal{L}_{fake} \qquad (1)$$

Following the GAN paradigm, the generator 220 is simultaneously and adversarially trained against discriminator D training. Discriminator $D^c$ (e.g., conditional discriminator 230) is also multimodal conditioned, takes either real or generated layout samples as well as multimodal conditions as input, and outputs real (1) or fake (0) binary classification:

$$D^c(\mathcal{L},B,T\cup\mathcal{P})\mapsto\{0,1\} \qquad (2)$$

The conditional discriminator 230 targets to adversarially boost the generator 220 to generate reasonable and realistic layouts constrained by background images and driven by multimodal foreground elements. In some embodiments, in order to further enhance the realism of layout structures regardless of conditions, an unconditional discriminator $D^u$ may also be trained:

$$D^u(\mathcal{L})\mapsto\{0,1\} \qquad (3)$$

There is an empirical observation that the discriminators tend to be non-sensitive to the positional trends of bounding boxes in a layout. For example, the discriminators lean to overlook the unusual layout where a header texts is placed at the bottom. As a result, position-aware regularization may be added to the conditional and unconditional discriminators. Specifically, an auxiliary decoder may be included for each discriminator to reconstruct its input. For example, auxiliary decoder 232 may be used in conjunction with conditional discriminator 230. The decoders $F^c/F^u$ take the output features $f^c/f^u$ of their discriminators $D^c/D^u$, add them with learnable positional embeddings $$\varepsilon^c = \{e_i^c\}_{i=1}^{N}/\varepsilon^u = \{e^u\}_{i=1}^{N},$$

and reconstruct the bounding box parameters and multimodal conditions that are the input of the discriminators:

$$F^c(f^c,\varepsilon^c)\mapsto \mathcal{L}_{dec}^c, B_{dec}, T_{dec}\cup\mathcal{P}_{dec} \qquad (4)$$

$$F^u(f^u,\varepsilon^u)\mapsto \mathcal{L}_{dec}^u \qquad (5)$$

The decoders are jointly trained with the discriminators to minimize the reconstruction.

All together the adversarial learning objective is formulated as:

$$\min_{G} \max_{D^c F^c \varepsilon^c D^u F^u \varepsilon^u} L_{GAN} \doteq \mathbb{E}_{z\sim\mathcal{N}(0,I),(B,T\cup\mathcal{P})\sim P_{data}} \qquad (6)$$

$$[\log(1-D^c(\mathcal{L}_{fake}, B, T\cup\mathcal{P})) + \log(1-D^u(\mathcal{L}_{fake}))] +$$

$$\mathbb{E}_{(\mathcal{L}_{real},B,T\cup\mathcal{P})\sim P_{data}}[\log(D^c(\mathcal{L}_{real}, B, T\cup\mathcal{P})) + \log(D^u(\mathcal{L}_{real})) -$$

$$L_{dec}(F^c(f^c, \varepsilon^c), (\mathcal{L}_{real}, B, T\cup\mathcal{P}) - L_{layout}(F^u(f^u, \varepsilon^u, \mathcal{L}_{real}))]$$

$$\mathcal{L}_{fake} = G(z, B, T\cup\mathcal{P}) \qquad (7)$$

where $$L_{dec}((\mathcal{L}_1, B_1, T_1, \bigcup \mathcal{P}_1), (\mathcal{L}_2, B_2, T_2, \bigcup \mathcal{P}_2)) = \quad (8)$$

$$\lambda_{layout} L_{layout}(\mathcal{L}_1, \mathcal{L}_2) + \lambda_{im}(\|B_1 - B_2\|_2 + L_{im}(\mathcal{P}_1, \mathcal{P}_2)) + \lambda_{text} L_{text}(T_1, T_2)$$

$$L_{layout}(\mathcal{L}_1, \mathcal{L}_2) = \frac{1}{N} \sum_{i=1}^{N} \|\hat{b}_1^i - \hat{b}_2^i\|_2 \quad (9)$$

$$L_{im}(\mathcal{P}_1, \mathcal{P}_2) = \frac{1}{N} \sum_{i=1}^{N} \|p_1^i - p_2^i\|_2 \quad (10)$$

$$L_{text}(T_1, T_2) = \frac{1}{N} \sum_{i=1}^{N} (\lambda_{str} L_{str}(s_1, s_2) + \lambda_{cls} L_{cls}(c_1, c_2) + \lambda_{len} L_{len}(l_1, l_2)) \quad (11)$$

$L_{dec}$ is the loss associated with auxiliary decoder 232. $L_{str}, L_{cls}, L_{len}$ are the reconstruction losses for foreground text strings, text classes, and text lengths respectively. $L_{str}$ is formulated as the auto-regressive loss according to BERT language modeling. $L_{cls}$ is the standard cross-entropy loss for classification. $L_{len}$ is also the standard cross-entropy loss for classification, a string length integer scalar is quantized (in the range of [0, 255], 0 indicating a non-text input) into 256 levels. $\lambda_{layout}, \lambda_{im}, \lambda_{text}, \lambda_{str}, \lambda_{cls}$ and $\lambda_{len}$ are hyper-parameters used to balance each loss term in the same order of magnitude.

For the VAE paradigm, the generator 220 is jointly trained with an encoder 208 that maps from the layout space to the latent noise distribution space. The output of E stands for the mean $\mu$ and covariance matrix $\Sigma$ of a multivariate Gaussian distribution, the sampling of which is used to trigger the generation of G:

$$E(\mathcal{L}) \mapsto \mu, \Sigma \quad (12)$$

$$\text{sample } (\mu, \Sigma) = z_0^T \sum\nolimits^{\frac{1}{2}} z_0 + \mu, z_0 \sim \mathcal{N}(0, I) \quad (13)$$

where Eq. 13 represents the differentiable reparameterization trick in standard VAE pipeline as described in Kingma and Welling, Auto-encoding variational bayes, ICLR, 2013. The conditional VAE objective is to maximize the evidence lower bound (ELBO) of real sample distribution, which is equivalent to minimize the reconstruction loss:

$$\min_{E, G} L_{VAE} \doteq \mathbb{E}_{\{\mathcal{L}_{real}, B, T \cup \mathcal{P}\} \sim P_{data}} [\lambda_{layout} L_{layout}(\mathcal{L}_{fake}, \mathcal{L}_{real}) + \quad (14)$$

$$\lambda_{KL} KL(E(\mathcal{L}_{real}) \| \mathcal{N}(0, I))]$$

$$\mathcal{L}_{fake} = G(\text{sample } (E(\mathcal{L}_{real}))B, T \cup \mathcal{P}) \quad (15)$$

$\lambda_{KL}$ is a hyper-parameter used to balance the loss term in the same order of magnitude as other losses.

$KL(\cdot\|\cdot)$ is the Kullback-Leibler (KL) Divergence used in standard VAE to regularize the encoded latent noise distribution close to a standard multivariate Gaussian. Without losing representativeness, the covariance matrix $\Sigma$ may be simplified as a diagonal matrix, meaning each of the d dimensions of multivariate Gaussian are non-correlated to each other. As a result, $\Sigma$ may be rewritten as its diagonal vector $\sigma^2$. Then the closed-form KL divergence is formulated as:

$$KL(\mathcal{N}(\mu, \sigma^2) \| \mathcal{N}(0, I)) = -\frac{1}{2} \sum_{j=1}^{D} (1 + \log \sigma_j^2 - \sigma_j^2 - \mu_j^2) \quad (16)$$

The VAE and GAN training frameworks are also compatible to each other. In this embodiment the encoder E from VAE, as well as the discriminators $D^c$ and $D^u$ from GAN, are trained together along with the training of generator G. Eq. 6 and Eq. 14 can be combined then to obtain:

$$\min_{E, G} \max_{D^c F^c \varepsilon^c D^u F^u \varepsilon^u} L_{GAN} + L_{VAE} \quad (17)$$

Other losses and regularization terms may also contribute to the generated layout quality. First, bounding box supervision may be added. The generalized intersection over union loss gIoU(•,•) may be used between generated layout and its ground truth $L_{gIoU}(\mathcal{L}_{fake}, \mathcal{L}_{real})$ where:

$$L_{gIoU}(\mathcal{L}_1, \mathcal{L}_2) = \lambda_{gIoU} \frac{1}{N} \sum_{i=1}^{N} gIoU(\hat{b}_1^i - \hat{b}_2^i) \quad (18)$$

where $\lambda_{gIoU}$ is a hyper-parameter used to balance the loss term in the same order of magnitude as other losses. IoU is invariant to the sizes of bounding boxes while the generalized version is differentiable for training.

Second, reconstructor R (e.g., conditional reconstructor 250) may be included. R takes the last features of G (e.g., generator 220) as input tokens before outputting box parameters, $$\mathcal{F} = \{f_i^g\}_{i=1}^{N}$$

and learns to reconstruct $\mathcal{P}$ and $\mathcal{P}$:

$$R(\mathcal{F}) \rightarrow \mathcal{P}_{rec}, T_{rec} \quad (19)$$

Jointly with G training, the model may be trained to minimize:

$$L_{rec} = \lambda_{im} L_{im}(\mathcal{P}_{rec}, \mathcal{P}_{real}) + \lambda_{text} L_{text}(T_{rec}, T_{real}) \quad (20)$$

where $L_{im}$ refers to Eq. 10 and $L_{text}$ refers to Eq. 11.

Third, reasonable layouts typically avoid overlapping with foreground elements. An overlap loss $L_{overlap} = \lambda_{overlap} L_{overlap}(\mathcal{L}_{fake})$ may be computed that discourages overlapping between any pair of bounding boxes in a generated layout. $\lambda_{overlap}$ is a hyper-parameter used to balance the loss term in the same order of magnitude as other losses.

Fourth, aesthetically appealing layouts usually maintain one of the six alignment between a pair of adjacent bounding boxes: left, horizontal-center, right, top, vertical-center, and bottom aligned. The misalignment loss (e.g., Eq. 10) $L_{misalign} \doteq \lambda_{misalign} L_{misalign}(\mathcal{L}_{fake})$ may be leveraged that discourages such misalignment. $\lambda_{misalign}$ is a hyper-parameter used to balance the loss term in the same order of magnitude as other losses.

Altogether the most complete combination of training objectives is formulated as follows:

$$\min_{E, G, R} \max_{D^c F^c \varepsilon^c D^u F^u \varepsilon^u} \quad (21)$$

-continued $$L_{GAN} + L_{VAE} + L_{gIoU} + L_{rec} + L_{overlap} + L_{misalign}$$

The losses (or a subset of the losses) may be used to update parameters of the model including the layout generator 220 via back-propagation.

Figure 3:
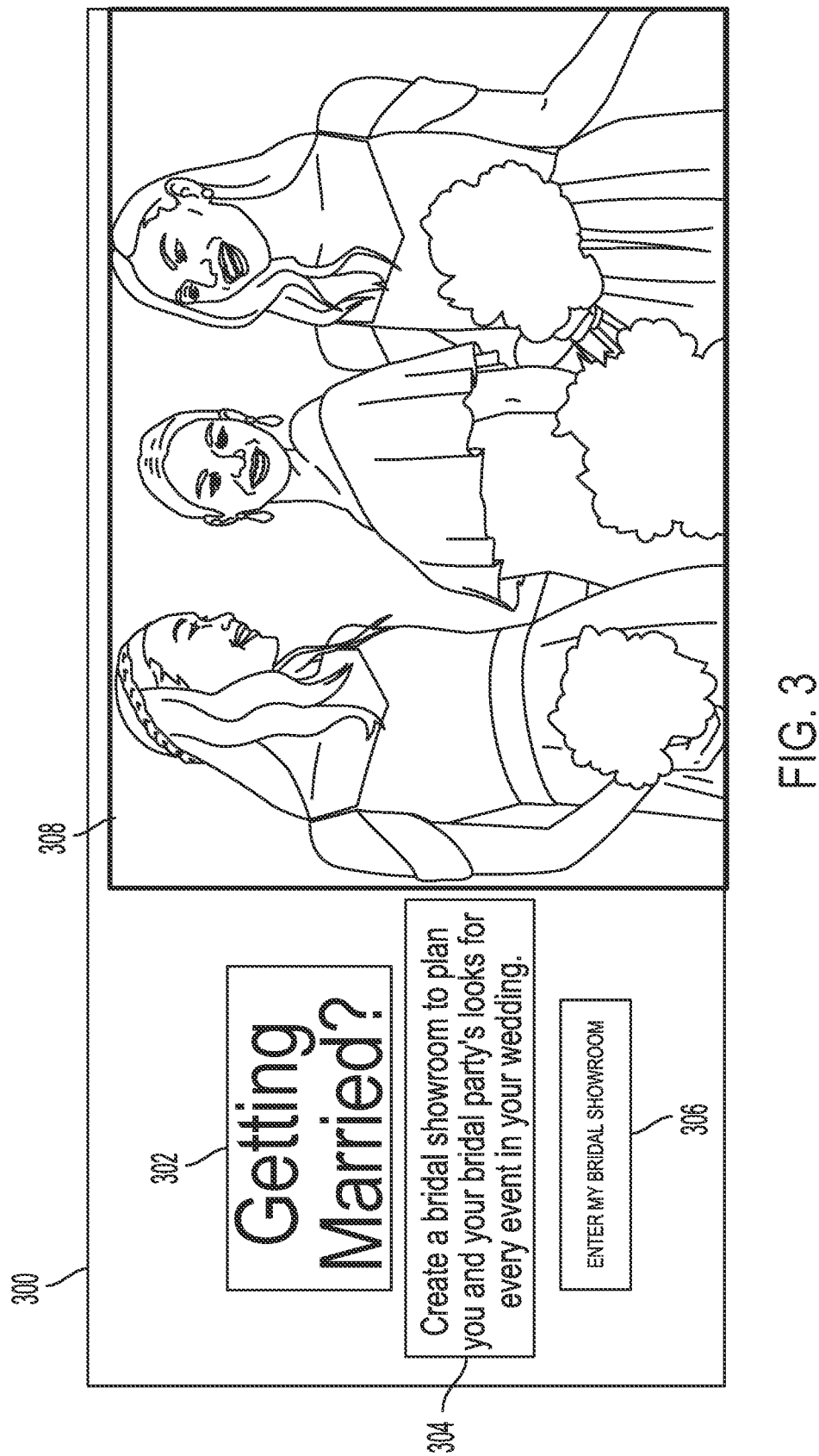
FIG. 3 illustrates an exemplary layout.

FIG. 3 illustrates an exemplary layout 300. This exemplary layout is illustrative of different foreground element categories, which may be labeled in a training dataset. Bounding box 302 contains a "header" type of foreground text. Generally a header has larger font size, capital letters, and accent to attract attention. [Inventors: What is meant here by "accent"?]. Bounding box 304 contains a "body" type of foreground text. Generally body text has smaller font size, and detailed information. Bounding box 306 includes a button type of foreground text. Button bounding boxes need to completely and tightly include the entire button. Bounding box 308 contains a foreground product image. The bounding box of an image needs to completely and tightly include all the foreground objects, and cannot go outside the banner canvas. In some embodiments, training layouts are automatically labeled by detecting the foreground elements.

Figure 4:
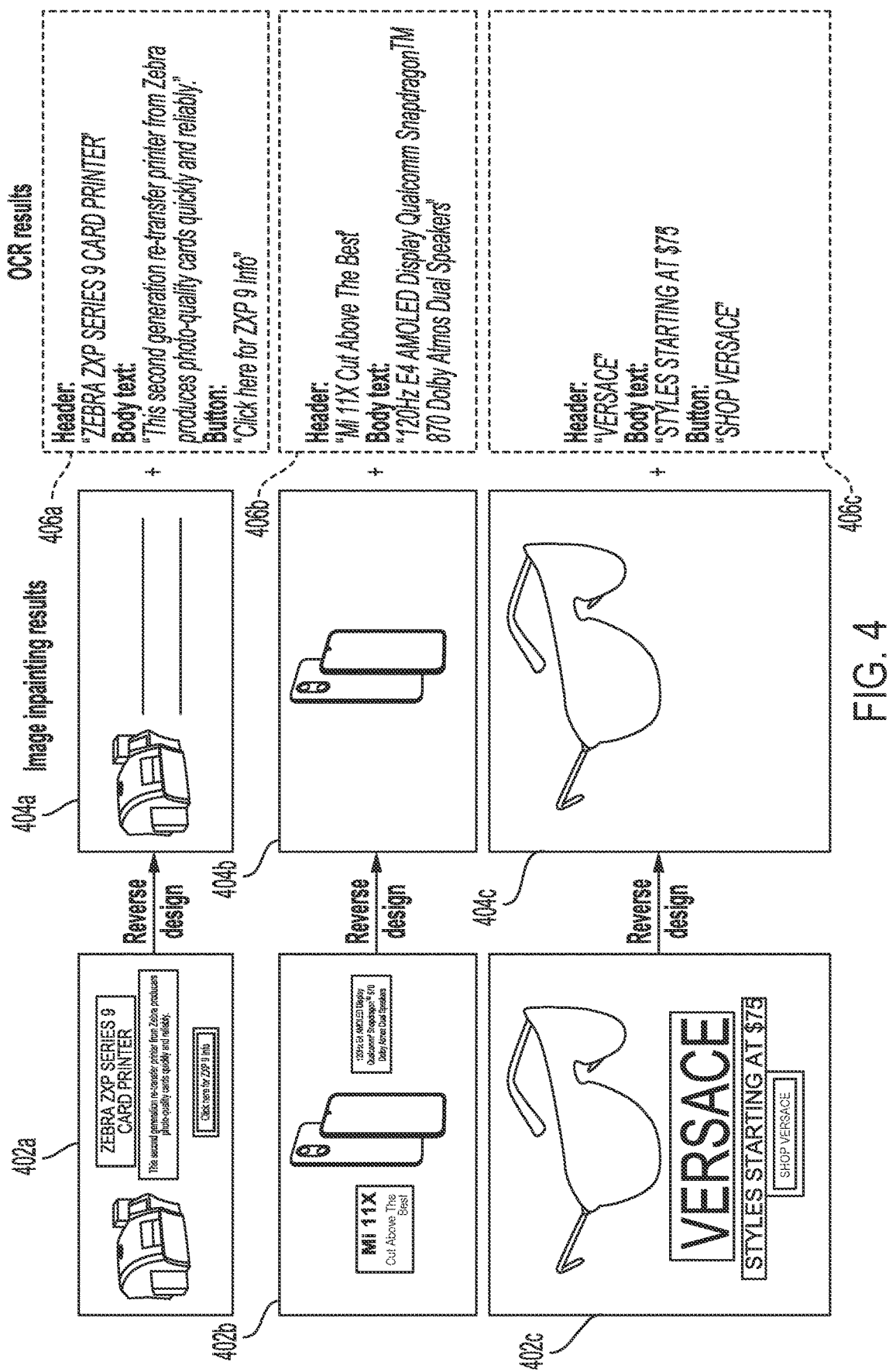
FIG. 4 illustrates examples of separating foreground elements from background images, according to some embodiments described herein.

FIG. 4 illustrates examples of separating foreground elements from background images, according to some embodiments described herein. In some embodiments, a training layout (e.g., layout 402a, 402b, or 402c) includes a background and overlaid foreground elements. Using an object detection model, bounding boxes may be generated around each of the foreground objects. Using optical character recognition (OCR) techniques, text elements may be identified and removed from the image. The area behind the removed elements may be filled using inpainting techniques, as shown in inpainting results 404a, 404b, or 404c. The inpainted image may be used as the background image for training purposes. Results of the OCR (e.g., OCR results 406a, 406b, or 406c) may be used to generate training data containing the text information used in training as described in FIGS. 1-2C.

Figure 5:
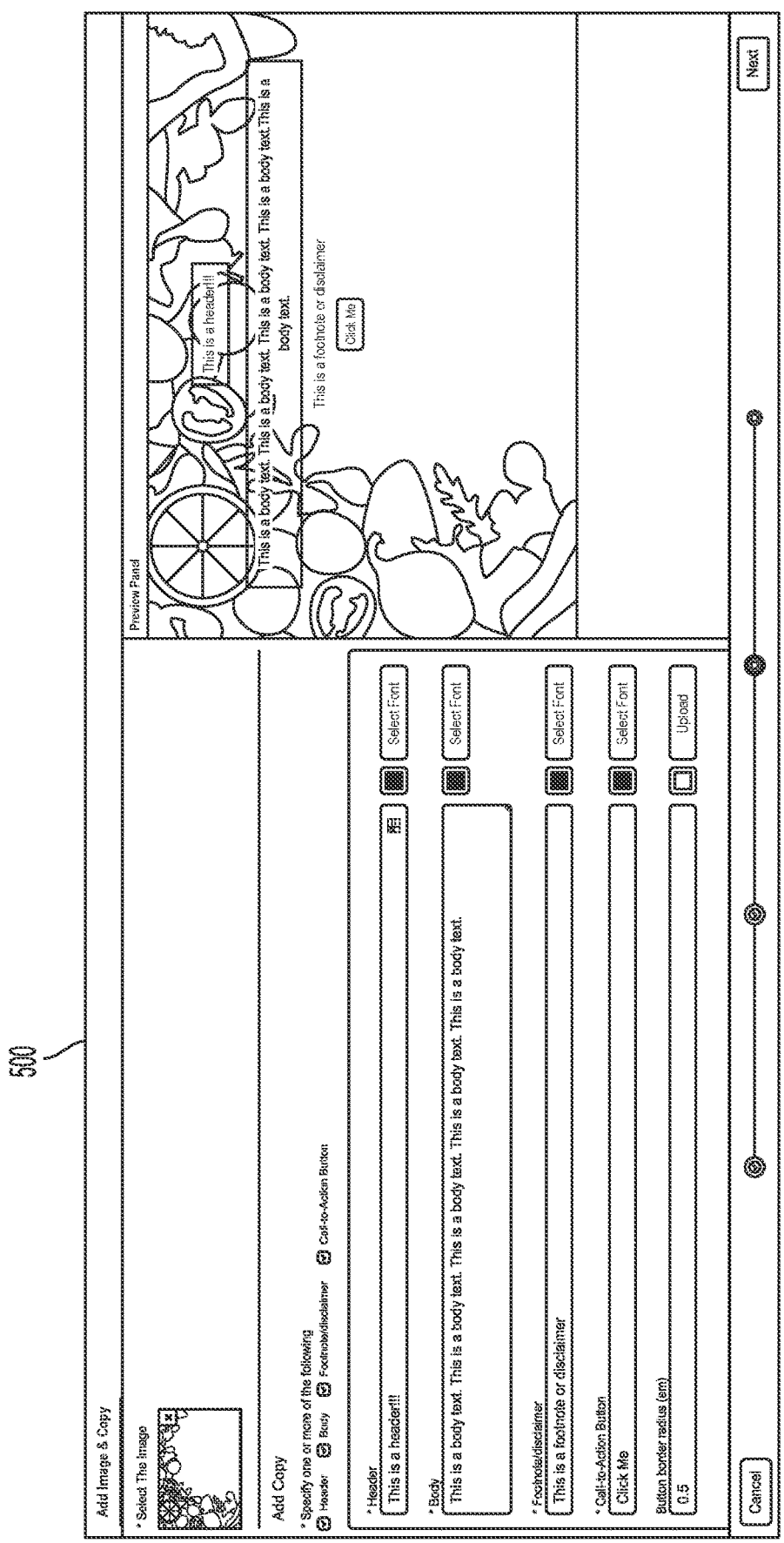
FIGS. 5-6 illustrates exemplary views of a user interface, according to some embodiments described herein.
Figure 6:
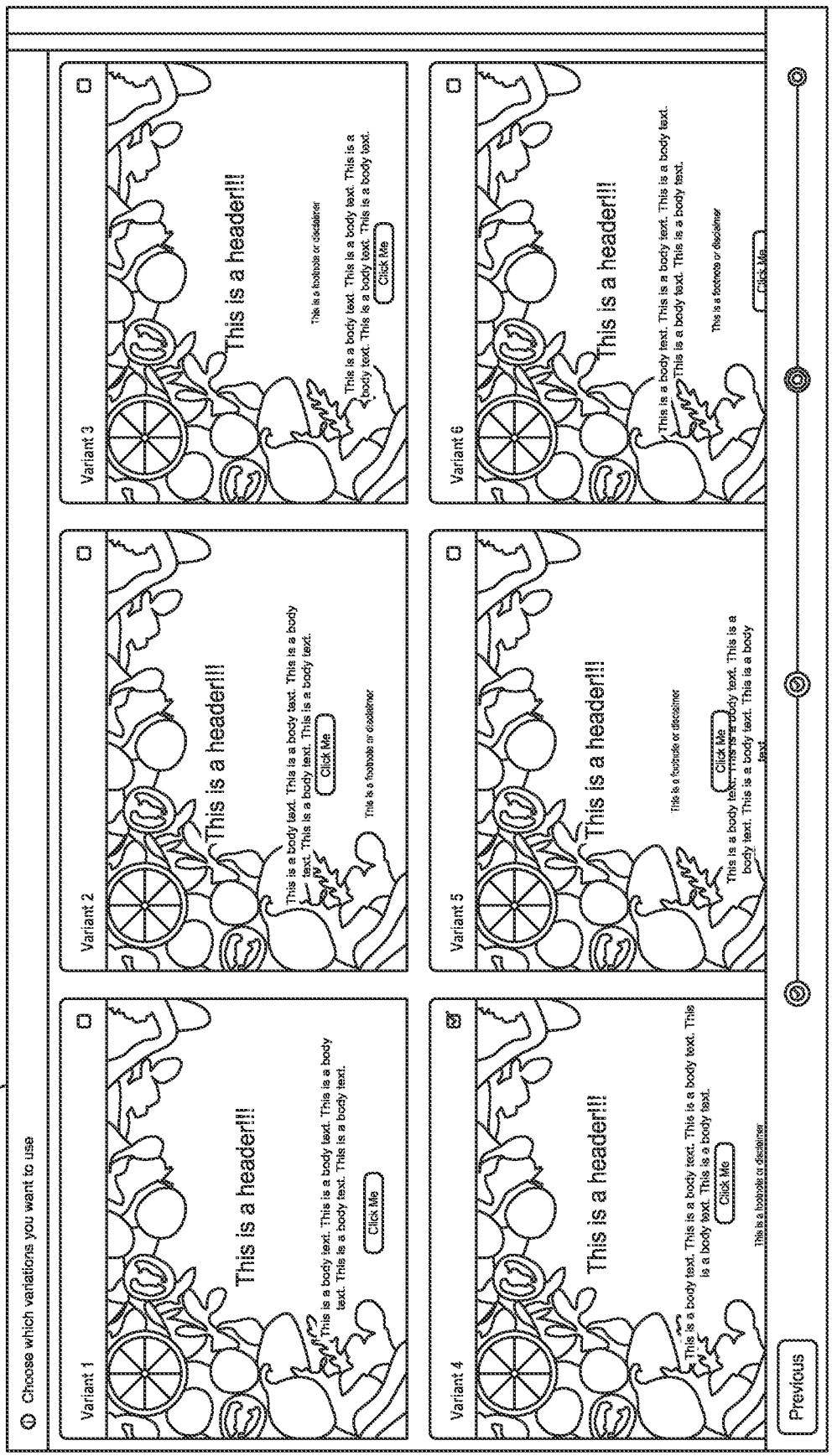

FIGS. 5-6 illustrates exemplary views of a user interface, according to some embodiments described herein. FIG. 5 illustrates a user interface view 500 that allows users to customize their background images and optionally foreground elements: header text, body text, footnote/disclaimer text, button text, as well as button border radius (zero radius means a rectangular button). Text colors, button pad color, and text fonts can be customized. Once users update their background and foreground elements, they are previewed on the right part of the same page, as illustrated. The locations and sizes of foreground elements in the preview are exemplary, and conceptually show what contents are going to be rendered on the background. Clicking the "Next" button advances to the next user interface view in FIG. 6.

FIG. 6 illustrates a user interface view that presents a number of variations of a generated layout. The layout generation model described herein generates one layout design in the backend. That generated layout is further post-processed with certain variations in the following three steps: (1) Randomly and independently jitter the generated box parameters by 20%. (2) By chance either center-align or left-align the boxes horizontally, or skip this step. (3) De-overlap two overlapping boxes by vertically pushing away their centers. These post-processing steps are exemplary, and a number of different combinations or other methods may be used to generate variants.

Afterwards, the system renders foreground elements given the layout bounding boxes. The text font sizes and line breakers are adaptively determined so as to tightly squeeze into the boxes. Considering header texts usually have short strings yet are assigned with large boxes, their font sizes are naturally large enough. In the example of FIG. 6, the user interface showcases six of the rendered results on this page, and allow users to select one or more satisfactory designs. Once a user make their selection(s) and click "Save Selection", the user interface allows the user to manually customize the size and location of each rendered foreground elements. Once they finish, they click "Save" to save the layout and exit the system.

Computer and Network Environment

Figure 7:
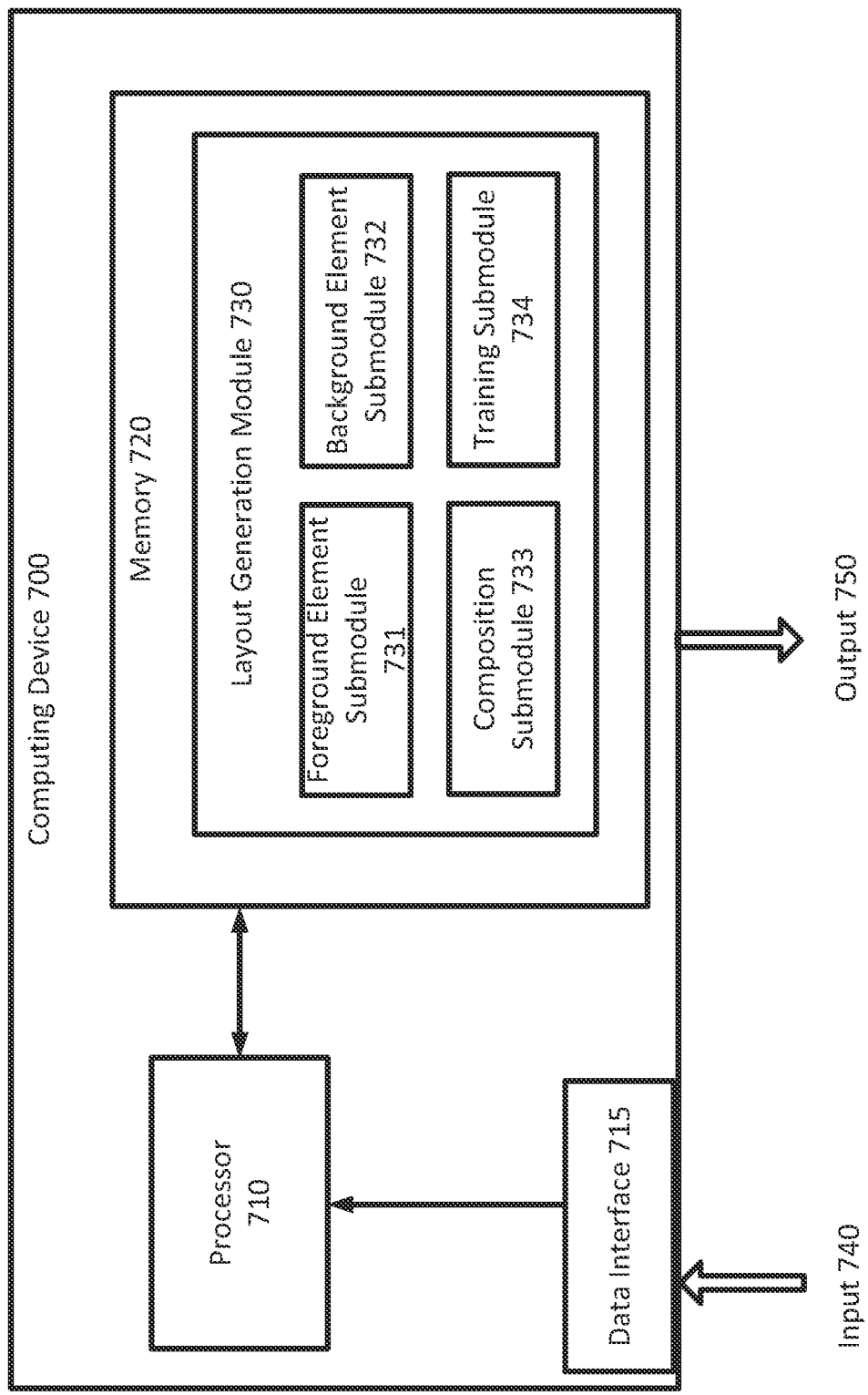
FIG. 7 is a simplified diagram illustrating a computing device implementing the layout generation framework, according to some embodiments described herein.

FIG. 7 is a simplified diagram illustrating a computing device implementing the layout generation framework, according to one embodiment described herein. As shown in FIG. 7, computing device 700 includes a processor 710 coupled to memory 720. Operation of computing device 700 is controlled by processor 710. And although computing device 700 is shown with only one processor 710, it is understood that processor 710 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 700. Computing device 700 may be implemented as a stand-alone subsystem, as a board added to a computing device, and/or as a virtual machine.

Memory 720 may be used to store software executed by computing device 700 and/or one or more data structures used during operation of computing device 700. Memory 720 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 710 and/or memory 720 may be arranged in any suitable physical arrangement. In some embodiments, processor 710 and/or memory 720 may be implemented on a same board, in a same package (e.g., system-in-package), on a same chip (e.g., system-on-chip), and/or the like. In some embodiments, processor 710 and/or memory 720 may include distributed, virtualized, and/or containerized computing resources. Consistent with such embodiments, processor 710 and/or memory 720 may be located in one or more data centers and/or cloud computing facilities.

In some examples, memory 720 may include non-transitory, tangible, machine readable media that includes executable code that when run by one or more processors (e.g., processor 710) may cause the one or more processors to perform the methods described in further detail herein. For example, as shown, memory 720 includes instructions for layout generation module 730 that may be used to implement and/or emulate the systems and models, and/or to implement any of the methods described further herein. A layout generation module 730 may receive input 740 such as an input training data (e.g., annotated layouts with background and foreground elements) or user inputs via the data interface 715 and generate an output 750 which may be a layout (e.g., bounding boxes for each element or a rendered layout) for an advertisement or other media.

The data interface 715 may comprise a communication interface, a user interface (such as a voice input interface, a graphical user interface, and/or the like). For example, the computing device 700 may receive the input 740 (such as a training dataset) from a networked database via a communication interface. Or the computing device 700 may receive the input 740, such as background images, foreground images, text inputs etc., from a user via the user interface.

In some embodiments, the layout generation module 730 is configured to generate a layout based on input elements. The layout generation module 730 may further include a foreground element submodule 731, a background element submodule 732, a composition submodule 733, and/or a training submodule 734. In one embodiment, the layout generation module 730 and its submodules 731 may be implemented by hardware, software and/or a combination thereof. Foreground element submodule 731 may be configured to extract foreground elements from training images, encoder foreground element information, concatenate the encodings, and further encode the concatenated encodings as described herein. Background element submodule 732 may be configured to perform object detection on the background image as described herein. Composition submodule 733 may be configured to compose a generated layout based on the inputs and generated bounding boxes as described herein. Training submodule 734 may be configured to train a layout generator as described herein.

Some examples of computing devices, such as computing device 700 may include non-transitory, tangible, machine readable media that include executable code that when run by one or more processors (e.g., processor 710) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 8:
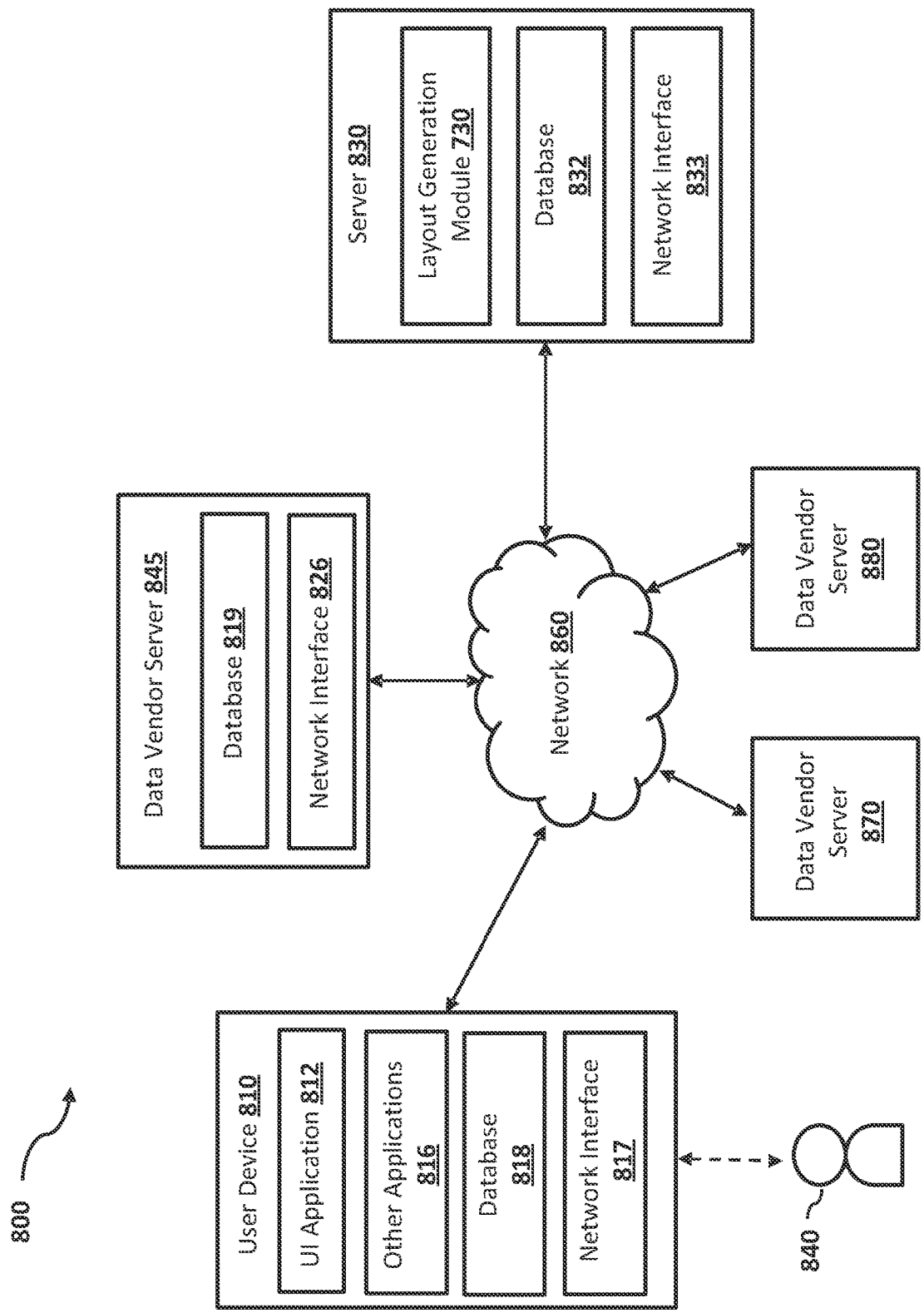
FIG. 8 is a simplified block diagram of a networked system suitable for implementing the layout generation framework described herein.

FIG. 8 is a simplified block diagram of a networked system suitable for implementing the layout generation framework described herein. In one embodiment, block diagram 800 shows a system including the user device 810 which may be operated by user 840, data vendor servers 845, 870 and 880, server 830, and other forms of devices, servers, and/or software components that operate to perform various methodologies in accordance with the described embodiments. Exemplary devices and servers may include device, stand-alone, and enterprise-class servers which may be similar to the computing device 700 described in FIG. 7, operating an OS such as a MICROSOFT® OS, a UNIX® OS, a LINUX® OS, or other suitable device and/or server-based OS. It can be appreciated that the devices and/or servers illustrated in FIG. 8 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 810, data vendor servers 845, 870 and 880, and the server 830 may communicate with each other over a network 860. User device 810 may be utilized by a user 840 (e.g., a driver, a system admin, etc.) to access the various features available for user device 810, which may include processes and/or applications associated with the server 830 to receive an output data anomaly report.

User device 810, data vendor server 845, and the server 830 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 800, and/or accessible over network 860.

User device 810 may be implemented as a communication device that may utilize appropriate hardware and software configured for wired and/or wireless communication with data vendor server 845 and/or the server 830. For example, in one embodiment, user device 810 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 810 of FIG. 8 contains a user interface (UI) application 812, and/or other applications 816, which may correspond to executable processes, procedures, and/or applications with associated hardware. For example, the user device 810 may receive a message indicating a generated layout such as an ad banner from the server 830 and display the message via the UI application 812. In other embodiments, user device 810 may include additional or different modules having specialized hardware and/or software as required.

In various embodiments, user device 810 includes other applications 816 as may be desired in particular embodiments to provide features to user device 810. For example, other applications 816 may include security applications for implementing client-side security features, programmatic client applications for interfacing with appropriate application programming interfaces (APIs) over network 860, or other types of applications. Other applications 816 may also include communication applications, such as email, texting, voice, social networking, and IM applications that allow a user to send and receive emails, calls, texts, and other notifications through network 860. For example, the other application 816 may be an email or instant messaging application that receives a prediction result message from the server 830. Other applications 816 may include device interfaces and other display modules that may receive input and/or output information. For example, other applications 816 may contain software programs for asset management, executable by a processor, including a graphical user interface (GUI) configured to provide an interface to the user 840 to view a generated layout such as an ad banner.

User device 810 may further include database 818 stored in a transitory and/or non-transitory memory of user device 810, which may store various applications and data and be utilized during execution of various modules of user device 810. Database 818 may store user profile relating to the user 840, predictions previously viewed or saved by the user 840, historical data received from the server 830, and/or the like. In some embodiments, database 818 may be local to user device 810. However, in other embodiments, database 818 may be external to user device 810 and accessible by user device 810, including cloud storage systems and/or databases that are accessible over network 860.

User device 810 includes at least one network interface component 817 adapted to communicate with data vendor server 845 and/or the server 830. In various embodiments, network interface component 817 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 845 may correspond to a server that hosts database 819 to provide training datasets including sample layout designs to the server 830. The database 819 may be implemented by one or more relational database, distributed databases, cloud databases, and/or the like.

The data vendor server 845 includes at least one network interface component 826 adapted to communicate with user device 810 and/or the server 830. In various embodiments, network interface component 826 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 845 may send asset information from the database 819, via the network interface 826, to the server 830.

The server 830 may be housed with the layout generation module 730 and its submodules described in FIG. 1. In some implementations, layout generation module 730 may receive data from database 819 at the data vendor server 845 via the network 860 to generate a layout. The generated layout may also be sent to the user device 810 for review by the user 840 via the network 860.

The database 832 may be stored in a transitory and/or non-transitory memory of the server 830. In one implementation, the database 832 may store data obtained from the data vendor server 845. In one implementation, the database 832 may store parameters of the layout generation module 730. In one implementation, the database 832 may store previously generated layout, and the corresponding input feature vectors.

In some embodiments, database 832 may be local to the server 830. However, in other embodiments, database 832 may be external to the server 830 and accessible by the server 830, including cloud storage systems and/or databases that are accessible over network 860.

The server 830 includes at least one network interface component 833 adapted to communicate with user device 810 and/or data vendor servers 845, 870 or 880 over network 860. In various embodiments, network interface component 833 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 860 may be implemented as a single network or a combination of multiple networks. For example, in various embodiments, network 860 may include the Internet or one or more intranets, landline networks, wireless networks, and/or other appropriate types of networks. Thus, network 860 may correspond to small scale communication networks, such as a private or local area network, or a larger scale network, such as a wide area network or the Internet, accessible by the various components of system 800.

Example Work Flows

Figure 9:
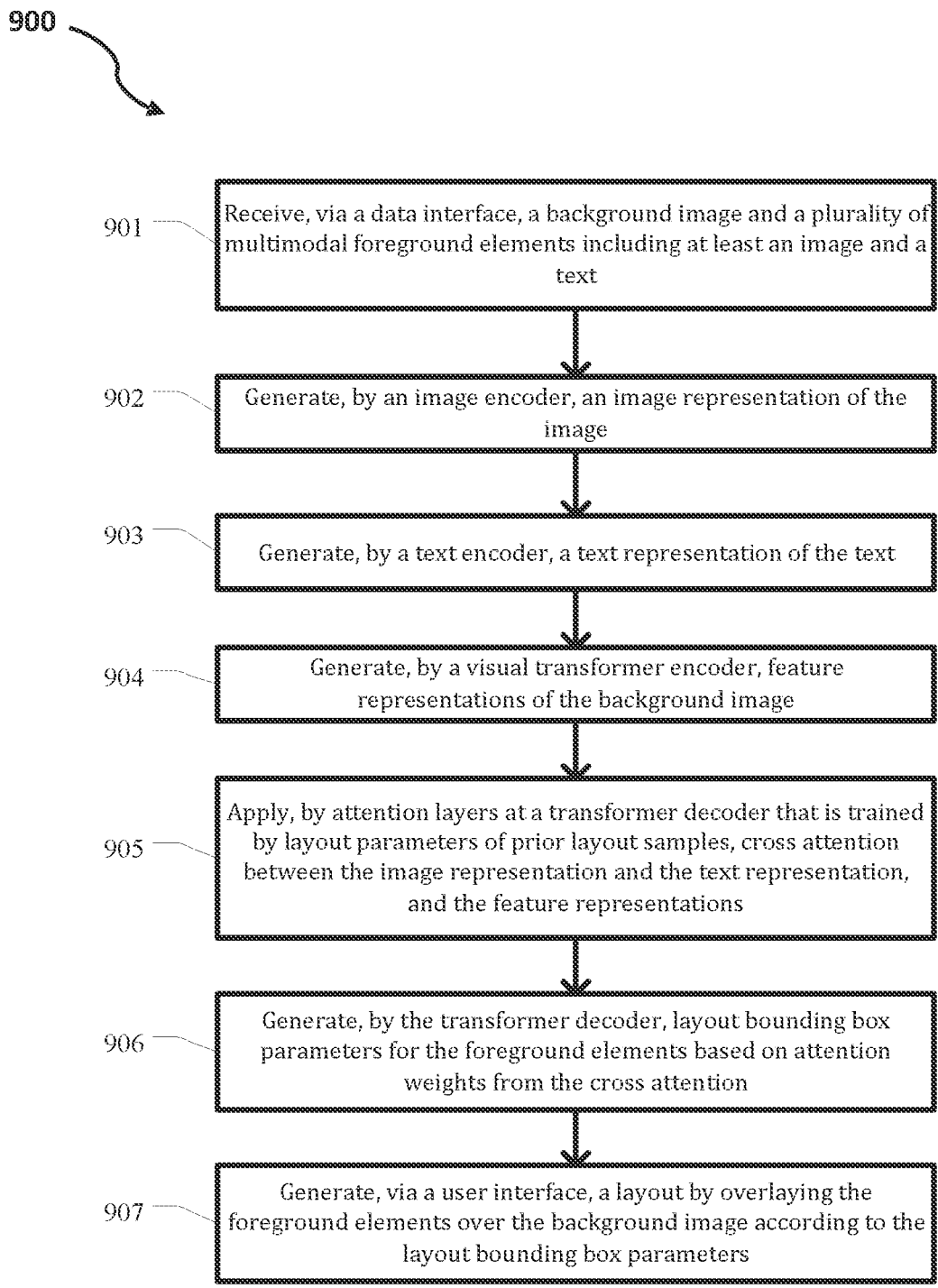
FIG. 9 is an example logic flow diagram illustrating a method of layout generation, according to some embodiments described herein.

FIG. 9 is an example logic flow diagram illustrating a method of layout generation based on the framework shown in FIGS. 1-8, according to some embodiments described herein. One or more of the processes of method 900 may be implemented, at least in part, in the form of executable code stored on non-transitory, tangible, machine-readable media that when run by one or more processors may cause the one or more processors to perform one or more of the processes. In some embodiments, method 900 corresponds to the operation of the layout generation module 730 (e.g., FIGS. 7-8) that generates layouts based on input elements.

As illustrated, the method 900 includes a number of enumerated steps, but aspects of the method 900 may include additional steps before, after, and in between the enumerated steps. In some aspects, one or more of the enumerated steps may be omitted or performed in a different order.

At step 901, a system receives, via a data interface, a background image and a plurality of multimodal foreground elements including at least an image and a text. During training the information may be from a training dataset. At inference, the data may be inputs from a user interface.

At step 902, the system generates, by an image encoder, an image representation of the image. In some embodiments, a convolutional neural network (CNN) encoder may be used.

At step 903, the system generates, by a text encoder, a text representation of the text. The text representation may be generated by a text encoder such as a BERT or dictionary encoder. The text may include information about the text such as a category label (e.g., "header" or "body text"), and length, in addition to the actual natural language text. The different text information may be individually encoded, and those encoded representations may be concatenated with a vector sampled from a multivariate gaussian distribution as described in FIG. 1. The concatenated vector may be passed through an MLP before being input to the transformer decoder.

At step 904, the system generates, by a visual transformer encoder, feature representations of the background image. This may be done according to a DETR style encoding to understand the context of the background image, and learn where is reasonable to superimpose foreground elements, for example less busy regions of the background image as described in FIG. 1.

At step 905, the system applies, by attention layers at a transformer decoder that is trained by layout parameters of prior layout samples, cross attention between the image representation and the text representation, and the feature representations.

At step 906, the system generates, by the transformer decoder, layout bounding box parameters for the foreground elements based on attention weights from the cross attention.

At step 907, the system generates, via a user interface, a layout by overlaying the foreground elements over the background image according to the layout bounding box parameters. The generated layout may then be presented to a user via a user interface. In some embodiments, variants of the generated layout may be produced by procedurally moving the generated bounding boxes. These variants may be presented via the user interface, allowing a user to select one or more preferred layouts.

Example Results

FIGS. 10-13 provide charts illustrating exemplary performance of different embodiments described herein. Datasets used for conducting the experiments included a newly-collected ads banner dataset with 7,196 samples. Systematic comparisons to baselines were additionally conducted on 32,063 CLAY mobile application UI samples as described in Li at al., Learning to Denoise Raw Mobile UI Layouts for Improving Datasets at Scale, CHI, 2022. Experiments also applied OCR and image inpainting processes to separate foregrounds and backgrounds. 90% of the samples were used for training, and 10% for testing.

Without losing representativeness, four recent state-of-the-art baseline methods were selected covering a variety of generative paradigms and architectures: LayoutGAN++ as described in Kikuchi et al., Constrained graphic layout generation via latent optimization, ACM MM, 2021; READ as described in Patil et al., Read: Recursive autoencoders for document layout generation, CVPR Workshops, 2020; Vinci as described in Guo et al., Vinci: an intelligent graphic design system for generating advertising posters, CHI, 2021; and LayoutTransformer as described in Gupta et al., Layouttransformer: Layout generation and completion with self-attention, ICCV, 2021. It is worth noting that Layout-GAN++, READ, and LayoutTransformer do not take multi-modality as input. For the sake of fair comparisons, the foreground and background encoders described herein were added to their implementations.

Metrics evaluated in the experiments include realism, accuracy, and regularity. To measure the realism of generated layouts, the Fréchet distances between fake and real feature distributions was calculated as described in Heusel et al., Gans trained by a two time-scale update rule converge to a local nash equilibrium, NeurIPS, 2017. Two third-party feature spaces were considered. One is the layout feature space pretrained as described in Kikuchi et al., Constrained graphic layout generation via latent optimization, ACM MM, 2021. The other is the image feature space pretrained with VGG network on ImageNet as described in Heusel et al., Gans trained by a two time-scale update rule converge to a local nash equilibrium, NeurIPS, 2017. To obtain images according to generated layouts, foreground image patches were overlaid and foreground texts rendered on top of background images.

To measure the accuracy of generated layouts with respect to their ground truth, the layout-to-layout IoU was calculated as described in Kikuchi et al., Constrained graphic layout generation via latent optimization, ACM MM, 2021; and DocSim as described in Patil et al., Read: Recursive autoencoders for document layout generation, CVPR Workshops, 2020. Their box-level matching process was skipped because the correspondences between generated and ground truth boxes are deterministic through input conditions.

Similar to the overlap loss and misalignment described above regarding training the model, they were also used for regularity measurements.

FIG. 10 illustrates an ablation study with respect to loss configurations on the ads banner dataset. Up and down arrows indicate higher or lower value respectively is more desirable. Bold/underline font indicates the top and second optimal value in that column. The experiment established from the multimodal conditioned version of LayoutGAN++ where the original LayoutGAN++ was enabled to take background and foreground as inputs. Extra loss terms were progressively added and the quantitative measurements are illustrated. Comparing across Row 1 and 2, all the metrics are improved, thanks to the enhanced controllability through the reconstruction of conditional inputs.

Comparing across Row 2 and 3, unconditional discriminator benefits the layout regularity due to its approximation power between generated layout parameters and the real regular ones. Comparing across Row 3 and 4, the supervised gIoU loss boosts the realism and accuracy in a significant margin, yet seemingly contradicts against the regularity. In Row 5, adding overlap loss and misalignment loss harmonizes all the measurements and achieves the optimum for each one. This embodiment (referred to as LayoutDETR-GAN) was used for the remaining experiments.

FIG. 11 illustrates the results of an ablation study with respect to conditional embedding configuration on the ads banner dataset. Up and down arrows indicate higher or lower value respectively is better. Bold font indicates the top optimal value in that column. For foreground texts, the experiment examined the importance of text length embeddings and text class embeddings by progressively removing them from the training. Comparing across Row 1 and 2, we realize that text length embeddings is beneficial in an overall manner. We reason that text length is a strong indicator of proper text box size. This validates that there is a positive correlation between text lengths and box sizes.

Comparing across Row 2 and 3, text label embeddings serve as the most essential role in the generation. LayoutFID deteriorates significantly without text label embeddings (Row 3) due to the phenomenon that boxes of similar texts tend to collapse to the same regions (referring to the 0.0 misalignment). This implies that text contents themselves are not as discriminative as text labels to differentiate box parameters. This also explains why a variety of layout datasets and models have to involve box labels.

FIG. 12 illustrates quantitative comparisons for ads banners. Three alternative variants were compared (GAN, VAE, VAE-GAN) for comparisons. At least one of the variants outperforms all the baselines in terms of realism and accuracy, while our LayoutDETR-GAN achieves the second best performance in terms of regularity. The margin to the best baseline is minor. This evidences the efficacy of the sophisticated background/foreground embedding designs and comprehensive loss configurations.

FIG. 13 illustrates quantitative comparisons for CLAY mobile application user interfaces. On the CLAY dataset, at least one of the variants outperforms all the baselines in terms of all the metrics. The efficacy generalizes in at least these two domains, the LayoutDETR-GAN variant achieves near-top measures all around with the most balanced performance. READ achieves similarly balanced performance on CLAY dataset, while the other baselines always miss at least one measurement by a significant margin. This is due to their generators by nature not designed for multimodal conditions.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of generating a visual layout for presenting content elements, the method comprising:
   receiving, via a data interface, a background image and a plurality of multimodal foreground elements including at least an image and a text;
   generating, by an image encoder, an image representation of the image with areas covered by the plurality of multimodal foreground elements inpainted;
   generating, by a text encoder, a text representation of the text;
   generating, by a visual transformer encoder, tokenized feature representations from of the background image;
   generating, by attention layers of a transformer decoder that is trained by layout parameters of prior layout samples, cross attention between the image representation and a concatenation of the text representation and the feature representations;
   generating, by the transformer decoder, layout bounding box parameters for the foreground elements based on attention weights from the cross attention; and
   generating, via a user interface, the layout by overlaying the foreground elements over the background image according to the layout bounding box parameters.

2. The method of claim 1, further comprising:
   generating variations of the layout bounding box parameters based on ensuring the foreground elements do not overlap; and
   generating variations of the layout by overlaying the foreground elements over the background image according to the variations of the layout bounding box parameters.

3. The method of claim 1,
   wherein the text includes any combination of a category label, a length, and a natural language text, and
   wherein the generating, by a text encoder, a text representation of the text comprises concatenating representations of the category label, the length, and the natural language text.

4. The method of claim 1, further comprising:
   sampling a vector based on a gaussian noise distribution;
   encoding the sampled vector; and
   concatenating the encoded vector with the text representation,
   wherein the cross attention with the text representation is cross attention with a representation based on the concatenated encoded vector and text representation.

5. The method of claim 4, further comprising:
   training the transformer decoder together with a layout encoder,
   wherein the layout encoder generates the gaussian noise distribution based on a bounding box parameter of a training layout.

6. The method of claim 1, further comprising:
   training a conditional discriminator to predict if a layout is a layout from a training dataset or a generated layout; and
   training the transformer decoder to minimize an accuracy of the conditional discriminator.

7. The method of claim 6, further comprising:
   training an auxiliary decoder to reconstruct the text based on a final feature layer of the conditional discriminator; and
   further training the conditional discriminator to maximize an accuracy of the auxiliary decoder.

8. The method of claim 1, further comprising:
   training a conditional reconstructor to reconstruct the text and the image based on a final feature layer of the transformer decoder; and
   training the transformer decoder to maximize an accuracy of the conditional reconstructor.

9. A system for generating a visual layout for presenting content elements, the system comprising:
   a memory that stores a transformer decoder and a plurality of processor executable instructions;
   a communication interface that receives a background image and a plurality of multimodal foreground elements including at least an image and a text; and
   one or more hardware processors that read and execute the plurality of processor-executable instructions from the memory to perform operations comprising:
      generating, by an image encoder, an image representation of the image with areas covered by the plurality of multimodal foreground elements inpainted;
      generating, by a text encoder, a text representation of the text;
      generating, by a visual transformer encoder, tokenized feature representations from the background image;
      generating, by attention layers of the transformer decoder that is trained by layout parameters of prior layout samples, cross attention between the image representation and a concatenation of the text representation and the feature representations;
      generating, by the transformer decoder, layout bounding box parameters for the foreground elements based on attention weights from the cross attention; and
      generating, via a user interface, the layout by overlaying the foreground elements over the background image according to the layout bounding box parameters.

10. The system of claim 9, the operations further comprising:
    generating variations of the layout bounding box parameters based on ensuring the foreground elements do not overlap; and generating variations of the layout by overlaying the foreground elements over the background image according to the variations of the layout bounding box parameters.

11. The system of claim 9,
wherein the text includes any combination of a category label, a length, and a natural language text, and
wherein the generating, by a text encoder, a text representation of the text comprises concatenating representations of the category label, the length, and the natural language text.

12. The system of claim 9, the operations further comprising:
sampling a vector based on a gaussian noise distribution;
encoding the sampled vector; and
concatenating the encoded vector with the text representation,
wherein the cross attention with the text representation is cross attention with a representation based on the concatenated encoded vector and text representation.

13. The system of claim 12, the operations further comprising:
training the transformer decoder together with a layout encoder,
wherein the layout encoder generates the gaussian noise distribution based on a bounding box parameter of a training layout.

14. The system of claim 9, the operations further comprising:
training a conditional discriminator to predict if a layout is a layout from a training dataset or a generated layout; and
training the transformer decoder to minimize an accuracy of the conditional discriminator.

15. The system of claim 14, the operations further comprising:
training an auxiliary decoder to reconstruct the text based on a final feature layer of the conditional discriminator; and
further training the conditional discriminator to maximize an accuracy of the auxiliary decoder.

16. The system of claim 9, the operations further comprising:
training a conditional reconstructor to reconstruct the text and the image based on a final feature layer of the transformer decoder; and
training the transformer decoder to maximize an accuracy of the conditional reconstructor.

17. A non-transitory machine-readable medium comprising a plurality of machine-executable instructions which, when executed by one or more processors, are adapted to cause the one or more processors to perform operations comprising:
receiving, via a data interface, a background image and a plurality of multimodal foreground elements including at least an image and a text;
generating, by an image encoder, an image representation of the image with areas covered by the plurality of multimodal foreground elements inpainted;
generating, by a text encoder, a text representation of the text;
generating, by a visual transformer encoder, tokenized feature representations of from the background image;
generating, by attention layers of a transformer decoder that is trained by layout parameters of prior layout samples, cross attention between the image representation and a concatenation of the text representation and the feature representations;
generating, by the transformer decoder, layout bounding box parameters for the foreground elements based on attention weights from the cross attention; and
generating, via a user interface, a layout by overlaying the foreground elements over the background image according to the layout bounding box parameters.

18. The non-transitory machine-readable medium of claim 17, the operations further comprising:
generating variations of the layout bounding box parameters based on ensuring the foreground elements do not overlap; and
generating variations of the layout by overlaying the foreground elements over the background image according to the variations of the layout bounding box parameters.

19. The non-transitory machine-readable medium of claim 17,
wherein the text includes any combination of a category label, a length, and a natural language text, and
wherein the generating, by a text encoder, a text representation of the text comprises concatenating representations of the category label, the length, and the natural language text.

20. The non-transitory machine-readable medium of claim 17, the operations further comprising:
sampling a vector based on a gaussian noise distribution;
encoding the sampled vector; and
concatenating the encoded vector with the text representation,
wherein the cross attention with the text representation is cross attention with a representation based on the concatenated encoded vector and text representation.

* * * * *